(12) United States Patent
King et al.

(10) Patent No.: US 9,652,493 B1
(45) Date of Patent: May 16, 2017

(54) DIGITIZED RELEASE NOTES

(71) Applicant: DELL PRODUCTS, L.P., Round Rock, TX (US)

(72) Inventors: Colin Joseph King, Round Rock, TX (US); Brahmananda R. Thodati, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 327 days.

(21) Appl. No.: 14/231,468

(22) Filed: Mar. 31, 2014

(51) Int. Cl.
G06F 17/30 (2006.01)
G06F 9/445 (2006.01)

(52) U.S. Cl.
CPC .......... *G06F 17/30386* (2013.01); *G06F 8/61* (2013.01)

(58) Field of Classification Search
CPC ..................................... G06F 8/60; G06F 8/65
See application file for complete search history.

(56) References Cited

U.S. PATENT DOCUMENTS

| | | | | |
|---|---|---|---|---|
| 7,979,854 B1* | 7/2011 | Borole | ...................... | G06F 8/65 709/222 |
| 8,453,141 B1* | 5/2013 | Poole | ........................ | G06F 8/68 717/169 |
| 2005/0234934 A1* | 10/2005 | Mackay | ............ | G06F 17/30581 |
| 2006/0080656 A1* | 4/2006 | Cain | ........................ | G06F 8/65 717/174 |
| 2007/0027971 A1* | 2/2007 | Marolia | ................ | H04W 4/001 709/223 |
| 2007/0129960 A1* | 6/2007 | Farrell, Jr. | ............ | G06Q 10/10 379/93.06 |
| 2008/0189693 A1* | 8/2008 | Pathak | ...................... | G06F 8/65 717/168 |
| 2008/0243862 A1* | 10/2008 | Pathak | ...................... | G06F 8/60 |
| 2009/0119158 A1* | 5/2009 | Chen | ..................... | H04L 41/507 705/7.11 |
| 2010/0306319 A1* | 12/2010 | Brzozowski | .............. | G06F 8/65 709/206 |
| 2011/0023021 A1* | 1/2011 | Miyazaki | .................. | G06F 8/68 717/168 |
| 2011/0202905 A1* | 8/2011 | Mahajan | ................... | G06F 8/43 717/140 |

(Continued)

*Primary Examiner* — Mohammad S Rostami
(74) *Attorney, Agent, or Firm* — North Weber & Baugh LLP (57) ABSTRACT

Aspects of the present invention include a digitized release notes configured to be automatically consumed by a management system or database and can be intelligently leveraged by the management systems for numerous purposes. In embodiments, having a repository of release notes contents, a management system can support various levels of queries for making or proposing solutions for an administrator while also providing a general overview of the release contents in a user consumable format. One advantage to such implementations is the time saved by administrators in gathering all the required information for each piece of the equipment under management. All the release notes information is readily at hand, even if the latest release is not currently installed in the production environment. Furthermore, this allows for flexibility in developing deployment plans (i.e., whether certain firmware/software is required to be updated, how an update affects other equipment, prioritization of updates, etc.).

19 Claims, 10 Drawing Sheets

(56) References Cited

U.S. PATENT DOCUMENTS

| | | | |
|---|---|---|---|
| 2012/0110093 A1* | 5/2012 | Tingstrom | G06F 17/30899 709/206 |
| 2014/0040070 A1* | 2/2014 | Pereymer | G06F 17/2247 705/26.8 |
| 2015/0143355 A1* | 5/2015 | Tingstrom | G06F 8/65 717/170 |

* cited by examiner

My Deployed Devices — 605

| | | AB-123 | | LAPR 469 | | XYZ 100 | | XYZ 505 | |
|---|---|---|---|---|---|---|---|---|---|
| 610 — Release Version | | 6.1.2.0 | 6.1.2.1 | 5.1.2.1 | 5.1.2.2 | 4.1.2.1 | 4.1.2.2 | 8.13.1 | 8.13.2 |
| 615 — Release Date | | 2/3/2013 | 6/4/2013 | 11/3/2012 | 5/3/2013 | 12/5/2012 | 6/3/2013 | 6/3/2013 | 9/3/2013 |
| 620 — Security Patch | | no | yes | no | yes | no | yes | yes | no |
| Features 625 | RFC 1812 | no change | fixed bug | | | | fixed bug | | new feature |
| | RFC 1256 | new bug | | new feature | known bug | | new bug | | |
| | RFC 1827 | new feature | deprecated | | | | | | |
| | IEEE 802.10 | | | | deprecated | | | | |
| | IEEE 802.1w | | | | | | | | |
| | IEEE 802.1x | | | | | | | | |
| 650 — Vendor specific | | | | | | | | | |
| Bug list 630 | bug1 | x | | x | | x | x | x | |
| | bug2 | | | | | | | | |
| | bug3 | | | | | | | | |
| | bug4 | x | x | | | | | | x |
| | bug5 | | | | | | | | |
| | bug6 | | | | | | | | |
| Bug description and workaround 635 | bug 1 | TEXT HERE | | TEXT HERE | | TEXT HERE | TEXT HERE | TEXT HERE | |
| | bug2 | | | | | | | | |
| | bug 4 | TEXT HERE | TEXT HERE | | | | | | TEXT HERE |
| | bug 5 | | | | | | | | |
| | bug 6 | | | | | | | | |
| Rt text 640 | Rt text field | TEXT HERE | TEXT HERE | TEXT HERE | TEXT HERE | TEXT HERE | TEXT HERE | TEXT HERE | TEXT HERE |
| | Rt text field | TEXT HERE | TEXT HERE | TEXT HERE | TEXT HERE | TEXT HERE | TEXT HERE | TEXT HERE | TEXT HERE |
| | Rt text field | TEXT HERE | TEXT HERE | TEXT HERE | TEXT HERE | TEXT HERE | TEXT HERE | TEXT HERE | TEXT HERE |
| | Rt text field | TEXT HERE | TEXT HERE | TEXT HERE | TEXT HERE | TEXT HERE | TEXT HERE | TEXT HERE | TEXT HERE |

DIGITIZED RELEASE NOTES

BACKGROUND

Field of Invention

The present invention relates generally to electronic devices, and relates more particularly to formatting and/or processing of release notes to facilitate intelligent management of electronic devices.

Description of the Related Art

Networking systems have become increasing more complicated. The added complexity is a result of many factors. First, because of increasing demands for bandwidth and features, networking systems are comprised of increasing more devices. Second, these devices are more complicated than their predecessors—performing more functions and more complicated functions. As companies compete to differentiate and outdo their competition, new features are constantly being added. Fourth, managing network systems is complex because a typical network system is an amalgam of devices from a number of different vendors—each with their own operating systems, bug fixes, updates, and the like. Fifth, network systems generally include numerous devices of different functional types that perform a wide range of functions, such as access, routing, switching, storage, security, etc. Thus, the types, severity, and frequency of updates for such a heterogeneous group of devices can vary widely.

For deployments of network equipment, such as enterprise networks, information technology (IT) administrators routinely rely on network management systems (NMS) to help monitor, configure, and update firmware for equipment that is part of the network. As noted above, production environments may include many different operating systems or firmware branches. Currently, each provider of firmware presents new features, fixes, and/or security issues in the form of release notes. Each provider's release notes are unique and are typically only provided in hard copy or online at the provider's website on a web page or in a portable document format (pdf) document.

Bug fixes, security patches, new features, and greater stability are few of the reasons that can trigger an upgrade to one or more devices in a network system. Another common reason for updates is the addition of new equipment or accessories that require a new software/firmware release. IT administrators need to constantly evaluate these release notes to determine whether an upgrade is warranted or even prudent.

Since network systems are often a collection of devices from a number of different providers, of a number of different types, or both, the burden on network administrators can be quite taxing. First, the issue is taxing because there is no central repository for the release notes. Rather, network administrators have to go to a number of places to find release notes. And second, once the release notes are located, the network administrator must then comb through the release notes looking for pertinent information.

Current network management systems have neither the ability to gather release notes, nor to readily parse the information for entry into a database, nor do they have the ability to evaluate current status of a network and recommend a firmware level based on current or future needs.

Accordingly, what is needed are systems and methods that can address these deficiencies and limitations of managing updates for a system of devices.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

In the following description, for purposes of explanation, specific examples and details are set forth in order to provide an understanding of the invention. It will be apparent, however, to one skilled in the art that the invention may be practiced without these details. Well-known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections.

Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media. Such devices, systems, methods, and instructions stored on one or more non-transitory computer-readable media can result in better, more efficient, and more intelligent ways of monitoring, managing, and/or deploying updates to devices in a network.

It shall be noted that, for purposes of explanation, the present invention is explained in the context of network systems and firmware. It shall be noted that these examples are provided for purposes of illustration and shall not be used to limit the present invention. Accordingly, the invention elements may be applied or adapted for use in other contexts. Thus, it shall be noted that aspects of the present invention may be applied to other applications and other computer code, including firmware and software (and regardless of whether an update or a full installation (initial installation or otherwise)).

1. Overview

Traditional management systems, such as (by way of example and not limitation) network and system management systems (NMS), do not have the ability to evaluate the current status of a network, or portions thereof, and recommend a firmware level. One of the faults of current implementations of management systems is the lack of integration with release notes. The current patent document presents unique systems and methods for formatting, storing, and/or using digitized release notes to assist in managing devices. By having release notes in a digitized format, the contents of the release notes may be readily consumed by or imported into a database or other system.

2. System Overview

Figure 1:
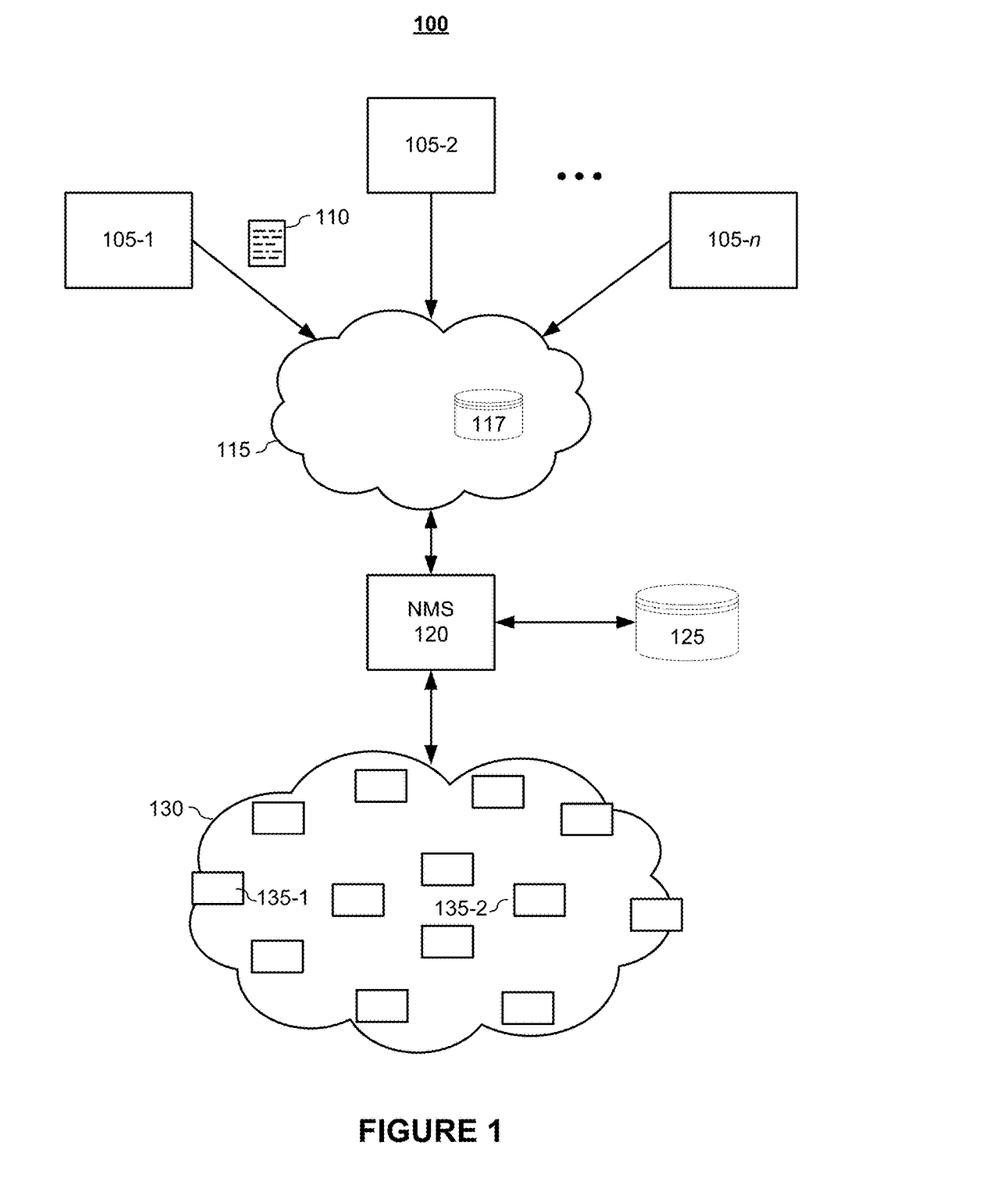
FIG. 1 depicts an example of a system for using digitized release notes according to embodiments of the present invention.

Turning to FIG. 1, depicted is an example of a system for supporting digitized release notes according to embodiments of the present invention. As shown in FIG. 1, one or more equipment vendors 105-*x* are communicatively coupled to a central repository 117 that may be communicatively connected to a centralize network 115, such as the Internet.

One or more of the equipment vendors 105-*x* may format its release notes 110 into a data file having a format such that the contents can be readily imported into a database. In embodiments, the data file 110 may use existing formats and technology such as (by way of illustration and not limitation) eXtensible Markup Language (XML) or JavaScript Object Notation (JSON). In embodiments, a centralized repository, such as by way of illustration and not limitation, a cloud-based update server (e.g., datastore 117) may be used for a device vendor or vendors to store digitized release notes and the related code (e.g., firmware/software), or links thereto. In embodiments, this data may be posted, accessed, or both at periodic intervals, according to custom schedules, manual checks, or some combination thereof.

Also communicatively coupled to the central repository 117 is a management system 120. In the depicted embodiment of FIG. 1, the management system 120 is a network management system, but it shall be noted that other management systems for different purposes may be also used. The network management system 120 is communicatively coupled to a network 130 that comprises a plurality of devices (e.g., 135-1 and 135-2), which are managed by the network management system 120. These devices may be of the same type or different types and may from the same or different vendors.

Via push notification, pull notification, other update mechanisms, or a combination thereof, the network management system 120 receives the digitized release notes that are pertinent to its network. The pertinences of the digitized release notes may be based upon one or more factors including but not limited to: (1) correlation to devices under management by the NMS; (2) prior history of requested or received digitized release notes; and (3) a listing or notice to the central repository or release notes provider of one or more devices, vendors, features, and other criteria of interest. In embodiments, the network management system 120 may store the digitized release notes in a database 125 or datastore.

Because the details of release notes for devices are in a digitized file format, this information may be imported into or otherwise used by a management system (e.g., NMS 120). In embodiments, the data files may be used to generate a matrix of issues, features, and/or RFCs (Request for Comments) to show an administrator in one or more views what each release contains. In embodiments, a matrix displayed to the admin or user may be demand generated from a database comprising the release notes information.

In embodiments, a database of release notes integrated with or into a management system (e.g., a Network Management System) can have several benefits, including, but not limited to the following. First, in embodiments, such a system can facilitate dynamic compliance of firmware across a network by leveraging the digitized release notes to identify some or all of the related devices/components that are not compliant with recommended firmware. In embodiments, non-compliance use cases may involve confirming security vulnerabilities and ensuring firmware updates across networking and end-client devices.

Second, in embodiments, the management system may be configured with auto-notifications (e.g., alerts, traps, syslog messages, emails, etc.) of non-compliant devices by leveraging the contents of the digitized release notes.

Third, firmware updates may be staged, new solutions may be rolled-out, or both by using contents of the digitized release notes and knowledge of the configurations of one or more devices in a system.

Fourth, in embodiments, a system may register and leverage the central repository to which the latest firmware images and patches are pushed by one or more vendors. Upon a new update, a system may be configured to automatically obtain a notification. And, because the digitized release notes are in a format that can be readily imported, a system may automatically, or with admin/user assistance, take one or more actions to deploy one or more computer code images across the relevant devices.

Fifth, sales and support may use such a system to easily show-case new products and features, thus enabling new innovative solutions and opportunities. Sales and support personnel may also employ this new design to identify how certain parts of the existing customer deployments are in need of upgrading based on the common sets of features and standards that admins and customers are looking for.

Sixth, support personnel may also send security advisories directly to the customer through such a system. Commonly, a security patch comes with its own release note. If the new release note information contains security-related information, a management system that receives release note data may be programmed to identify a security flag in the digitized release notes and alert the admin.

Finally, it should be noted that, in embodiments, the digitized release note systems and methods may be utilized by a single vendor. Alternatively, given the flexibility of aspects of the systems and methods presented herein, digitized release notes may be extended to any third parties, such as OEM partners.

The foregoing benefits are provided by way of example only. One of ordinary skill in the art shall recognize that the present invention may provide other benefits as well.

3. Method Embodiments

Figure 2:
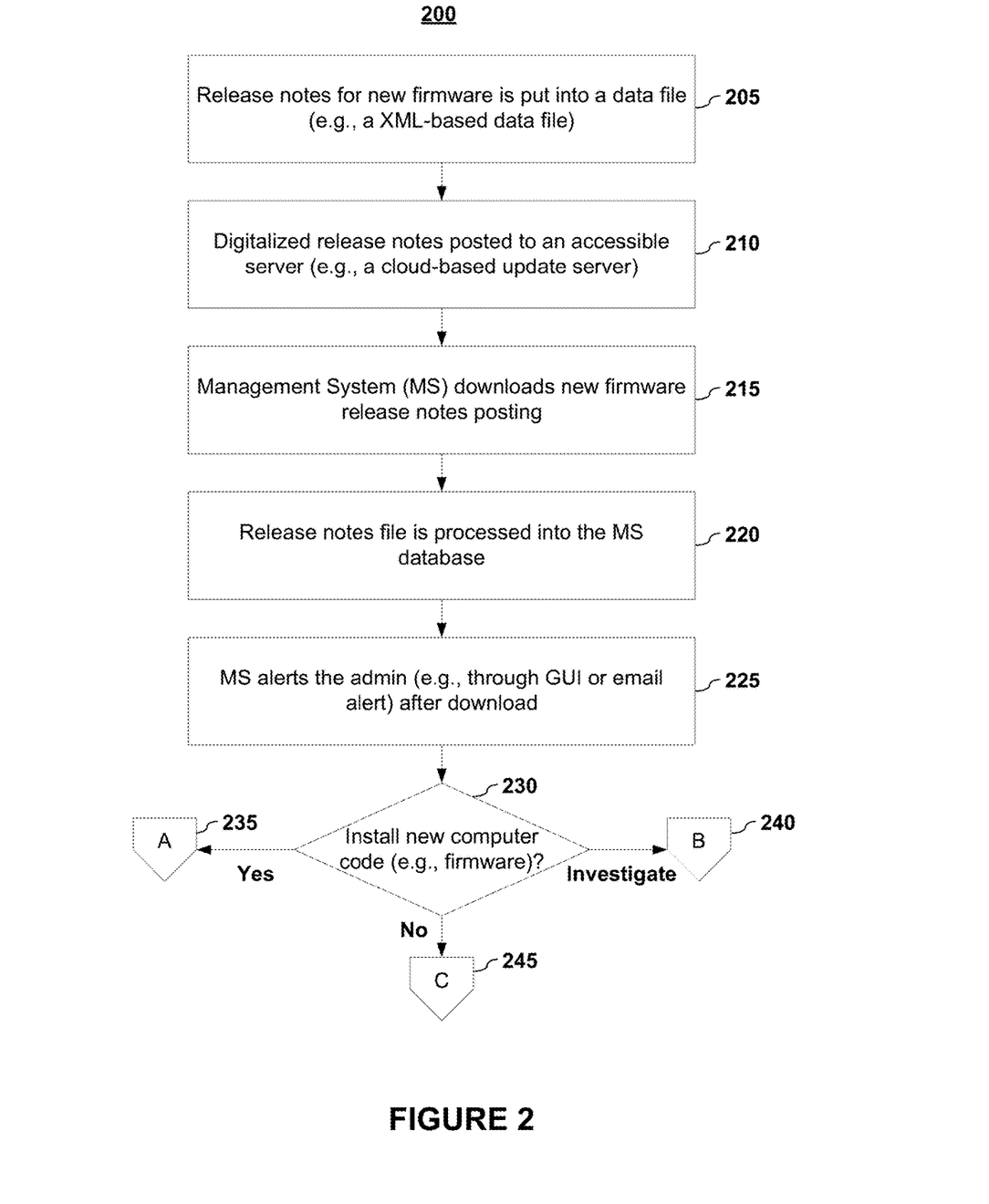
FIG. 2 depicts a method for using digitized release notes according to embodiments of the present invention.

FIG. 2 depicts a method for using digitized release notes according to embodiments of the present invention. In embodiments, a digitized release note for computer code (such as, by way of example and not limitation, new firmware) is put (205) into a data file (such as, by way of example and not limitation, a XML-based data file). The digitalized release notes may then be posted (210) to a cloud-based server or other accessible update server. A Management System (MS) downloads (215) the new firmware release notes posting or postings. The release notes file or files are processed (220) into the MS database. Because the release note files are in a digitized format, the release notes files can be easily and correctly entered into the database. In embodiments, the MS may be configured to alert (225) an administrator (e.g., through a graphical user interface (GUI), email alert, audio alert, text message, etc. or some combination thereof) after download. In embodiments, the digitized release notes may include one or more fields for specific items or flags that can be helpful for alerting or prioritizing updates. For example, in embodiments, new release notes may include one or more fields that identify security and/or time critical patches. Thus, in embodiments, when the management system receives the digitized release, parses the information, and imports it into a database, these fields can be examined and appropriate alerts can be sent to help the administrator to prioritize upgrades. In embodiments, the fields and types of information that may be included in alerts or used for triggering alerts may be user selected. For example, in embodiments, a user may select to receive priority alerts whenever a new release affects a certain feature or features or for any security-related updates.

By creating a database of release notes with contents that are entered into searchable or otherwise useable fields, the administrator may use the release notes to take one of a number of different options related to the release notes. Consider, by way of illustration and not limitations, the various options related to installing (230) computer code related to a release note presented in FIGS. 3-5.

Figure 3:
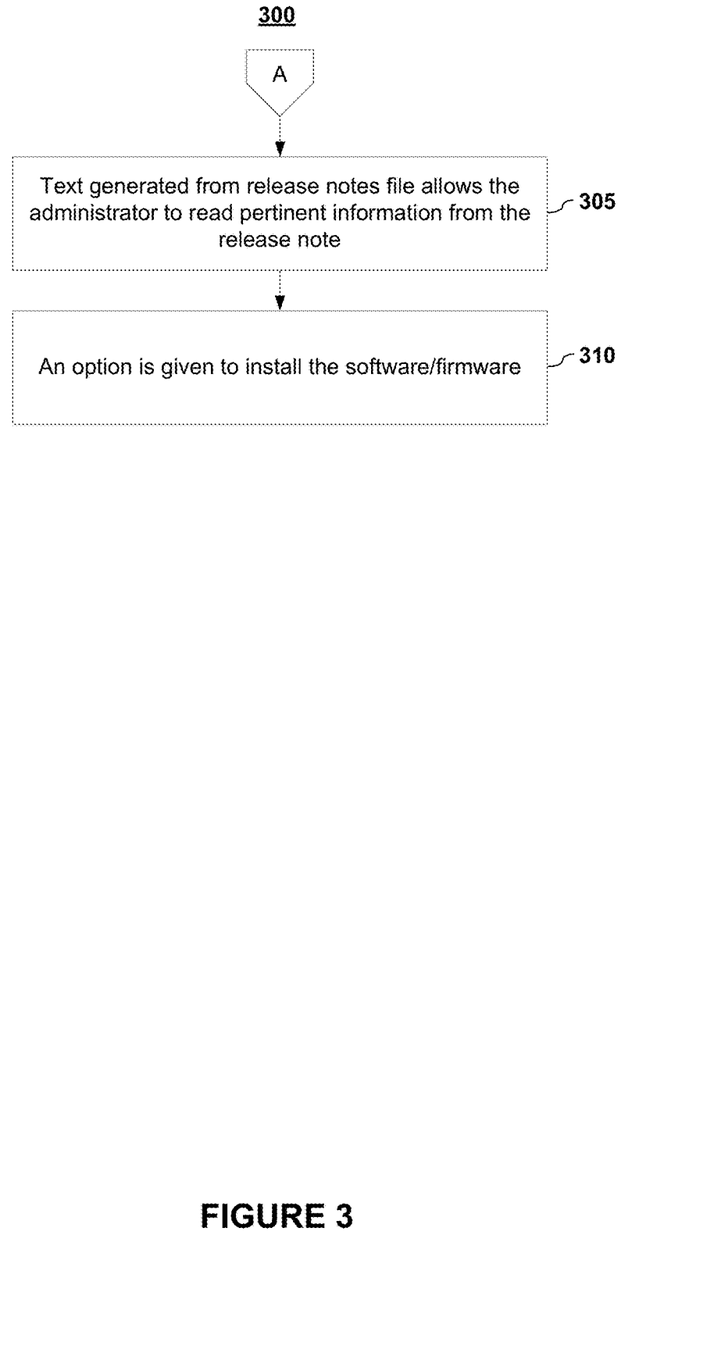
FIG. 3 depicts a method for using digitized release notes to install computer code according to embodiments of the present invention.

FIG. 3 depicts a method for using digitized release notes to install computer code according to embodiments of the present invention. As depicted in FIG. 3, if an administrator desires to install code, such as a firmware/software update, related to a release note, in embodiments, text generated or otherwise obtained from the release notes allows administrator to review the pertinent information the release note. In embodiments, the information may be presented to the administrator within a pop-up window in a GUI. In embodiments, the information, or a link to the pertinent information, may be presented or included in an alert.

In embodiments, one or more user interfaces may be presented to the administrator to give him/her an option to install (310) the software/firmware. In embodiments, the option to install may be presented after the administrator has reviewed the release notes information. Such a configuration is beneficial because if there are alerts or other important information, the administrator is made aware of this information before initiating the installation.

Figure 4:
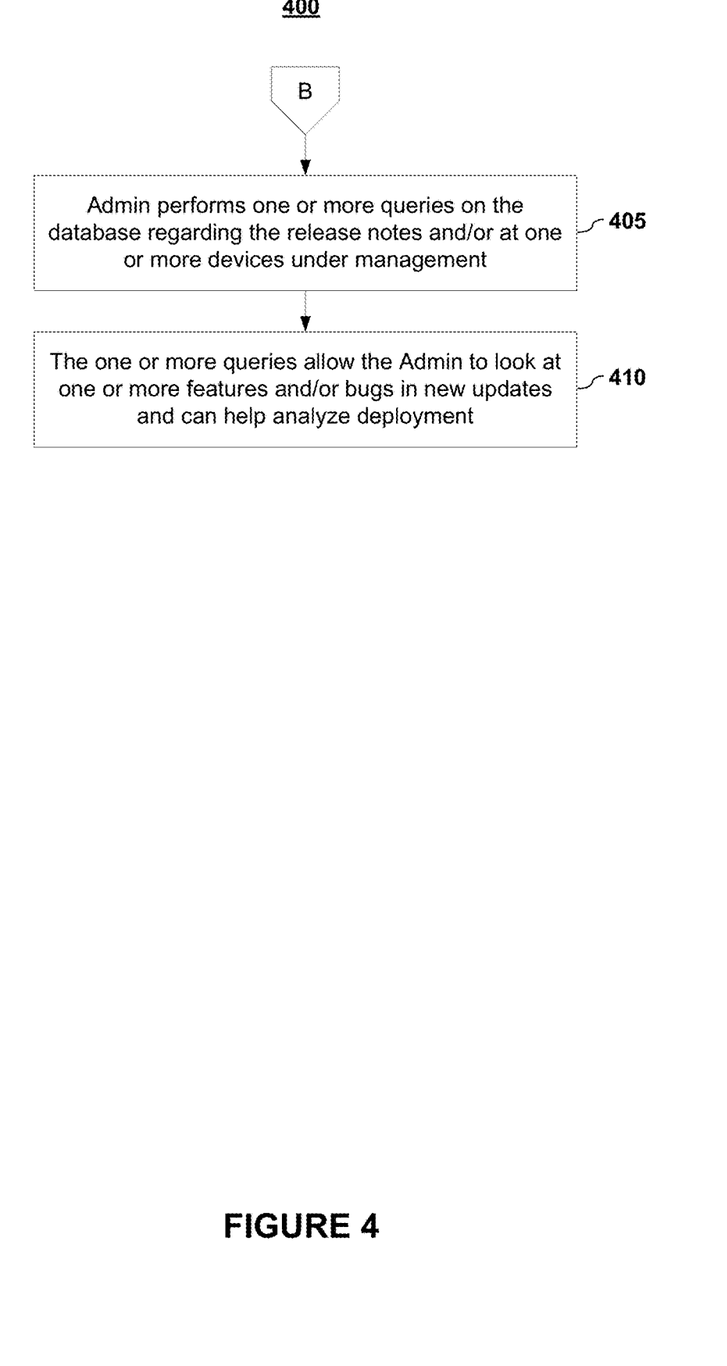
FIG. 4 depicts a method for using digitized release notes to install computer code according to embodiments of the present invention.

FIG. 4 depicts a method for using digitized release notes to install computer code according to embodiments of the present invention. As depicted in FIG. 4, one or more new release notes may cause an administrator to want to investigate the release notes, including but not limited to investigating their potential effects. Accordingly, in embodiments, the administrator may perform (405) one or more database queries regarding the release notes and/or about one or more devices under management. Because the contents of the release notes are in a searchable database, the queries allow (410) the administrator to look at one or more features and/or bugs in updates and can help analyze deployment. For example, if an update will result in the deprecation or disablement of a feature and other devices in the network rely upon or interact with that feature, the administrator may want to make other changes to the network or wait before installing the update. Thus, by doing a search in the database for devices that include that feature, the administrator can more intelligently develop a deployment plan. Similarly, an administrator may discover via the database of release notes that the installation of an update for devices of type X requires that another set of devices of type Y be updated first—before the update to the devices of type X is applied.

In embodiments, the management system may also include the ability to perform simulations of updates. Because the management system has centralized access to all of the various release notes, simulation models may be generated and analyses may be performed to detect incompatibilities or other issues that previously could not be performed.

Previous to the invention of the systems and methods presented herein, administrators could not perform such investigations and develop such deployment plans because the release notes were not in a central database nor were not readily searchable and usable. Combining this functionality with centralized information related to the configuration statuses of devices under management provides an administrator with powerful tools to intelligently manage the devices.

Figure 5:
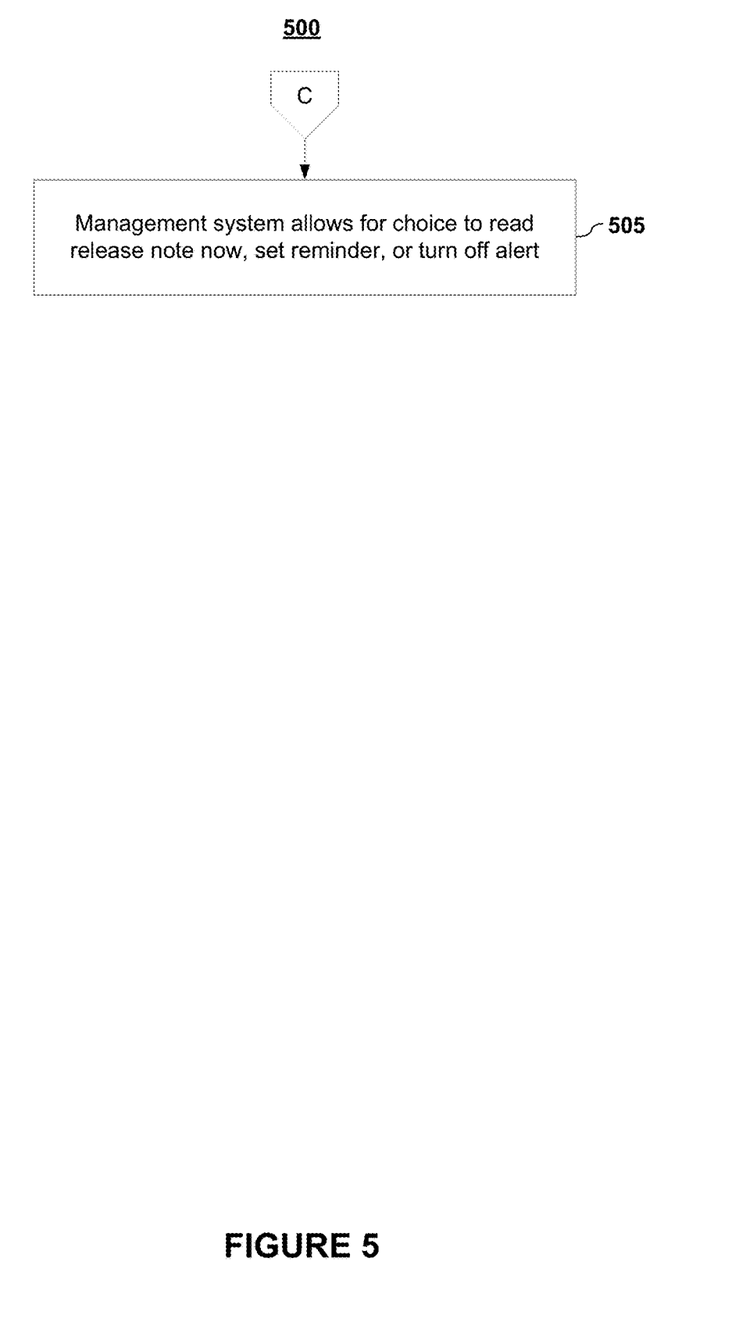
FIG. 5 depicts a method for using digitized release notes for managing installations of computer code according to embodiments of the present invention.

FIG. 5 depicts a method for using digitized release notes for managing installations of computer code according to embodiments of the present invention. As depicted in FIG. 5, in embodiments, if an administrator decides he/she wants to investigate information related to a release note or notes, the management system allows the administrator one or more choices to do so. For example, in embodiments, the management system may present, via one or more interfaces, an administrator with the choice to read release note at that time, set reminder to review the release notes at a later time, turn off alert, run simulations, or a combination thereof.

In embodiments, in investigating a release note to determine a deployment plan, the management system can facilitate one or more queries of the release notes. One skilled in the art shall recognize that the content, format, and arrangement of the query results may be presented in a wide variety of ways, including graphically, in text, in combinations of graphics and text, linked to provide additional data, etc. Consider, by way of illustration and not limitation, an example depiction of a database of digitized release notes according to embodiments of the present invention as presented in FIG. 6.

Figure 6:
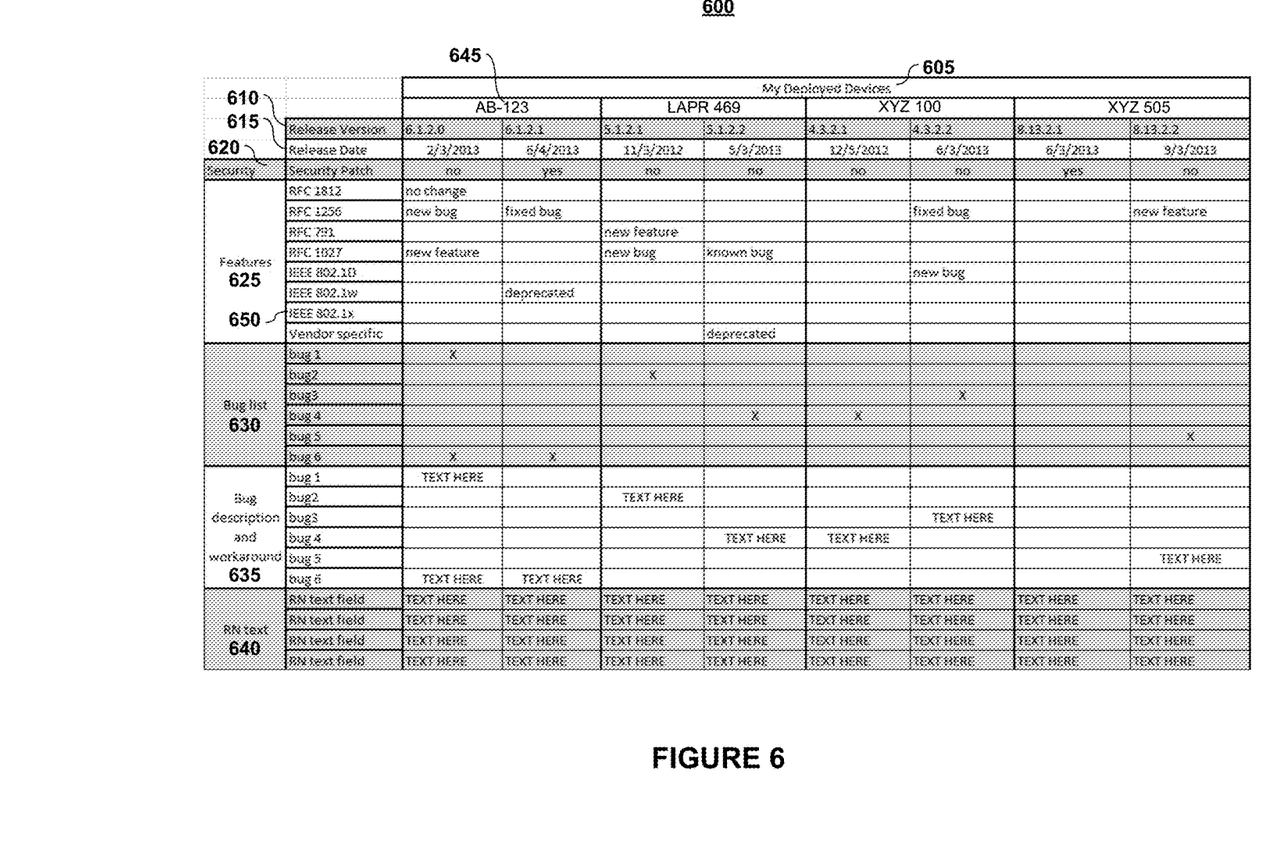
FIG. 6 depicts an example of a display from a datastore comprising a plurality of digital release notes according to embodiments of the present invention.

FIG. 6 depicts an example of a display from a datastore comprising a plurality of digital release notes according to embodiments of the present invention. As shown, the display includes a listing of the devices 605 that the network management system manages. As previously noted, by using digitized release notes, the information can be easily parsed and entered into fields in a database. These fields may include the release version 610, release date 615, whether the release affects security 620, features listing 625, bug lists 630, and text such as bug descriptions 635 and other release note text 640.

In embodiments, the display 600 may include links that, when selected, present additional information to help an administrator when analyzing a network or developing a deployment plan. For example, in embodiments, by clicking on a device (e.g., "AB-123") 645, a display of all of the devices of that model in the network are presented. The presented data may also include a graphical display of its logical position within the network, what release version each device is currently running, or other information. In yet another example, in embodiments, by clicking on feature (e.g., "IEEE 802.1x" 650), a display of all devices in the network that include or utilize that feature may be presented. The presented data may also include a graphical display of its logical position within the network, what release version each device is currently running, or other information. Such a display may also allow the administrator to link to release notes for other devices that operate with that feature to determine compatibility/interoperability issues with updates. One skilled in the art shall recognize other presentations of data may be provided for assisting an administrator who is monitoring, analyzing, and/or developing deployment plans. It shall also be noted that because the digitized release notes allow for importation into a database, aspects of the present invention also can support custom searches and the generation of custom displays.

Figure 7:
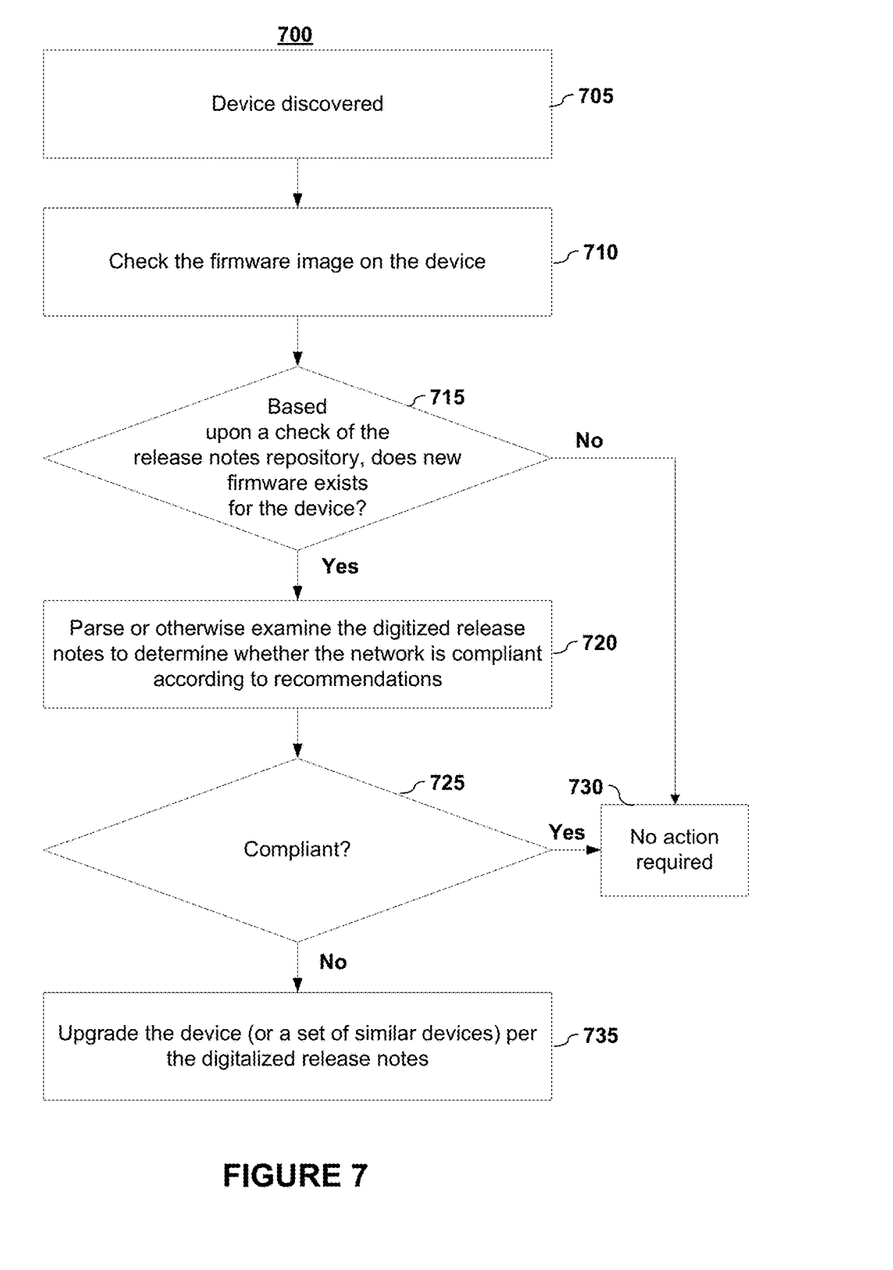
FIG. 7 depicts methodologies for using digitized release notes according to embodiments of the present invention.

FIG. 7 depicts a device discovery methodology for using digitized release notes according to embodiments of the present invention. In the depicted embodiment, a management system discovers or identifies (705) a device under its management. The discovered device is checked (710) to ascertain the current configuration status, such as the current firmware image on the device. It shall be noted that, in embodiments, the management system may access the device to ascertain this information; or alternatively, this information may be contained with a database, which may be the same database that contains the release notes data.

In embodiments, the release notes repository may be checked (715) to determine whether one or more new updates exist for the device relative to its current configuration. If no update exists, no action need be taken (730).

If an update exists, the applicable digitized release note(s) may be parsed or otherwise examined (720) to determine whether the network is compliant according to one or more recommendations of the release notes, one or more rules, one or more policies, or a combination thereof. If the network is compliant (725), no additional action need be taken (730).

If the network is not compliant (725), the device, or a set of similar devices, may be updated according to the digitalized release note or notes.

Figure 8:
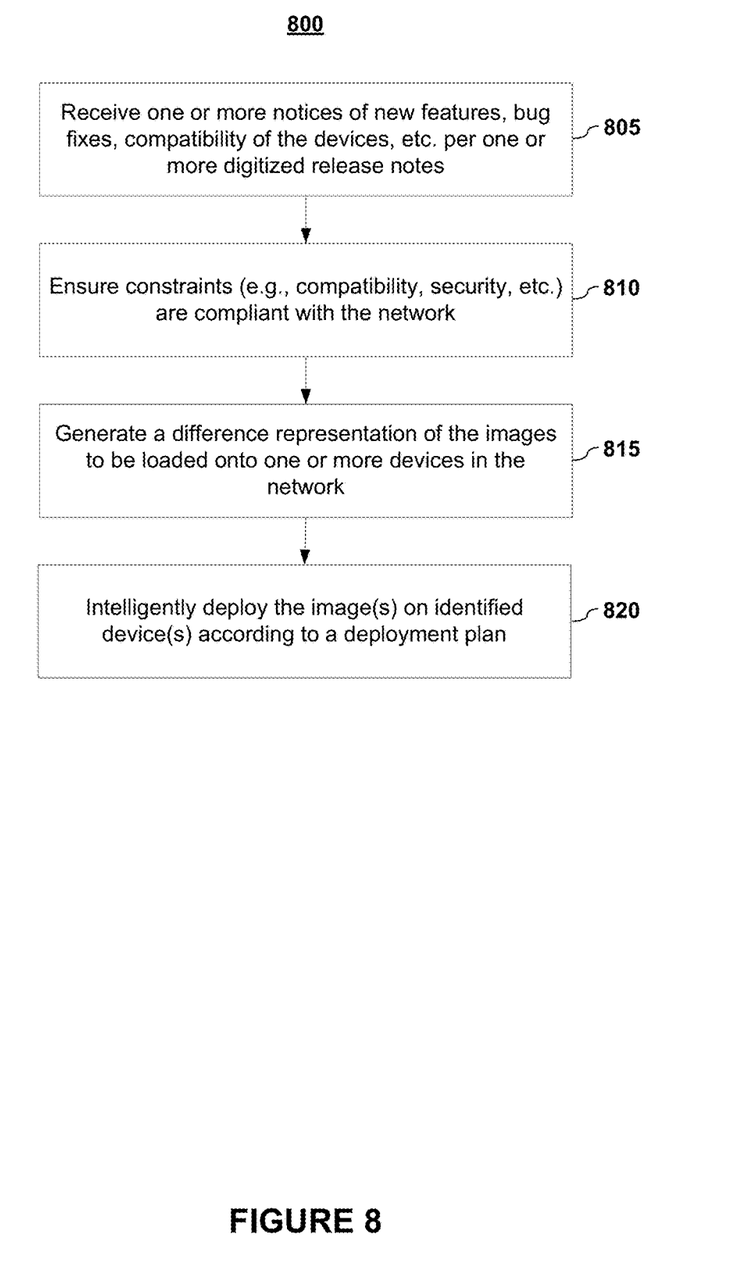
FIG. 8 depicts a push-notification embodiment of a methodology for using digitized release notes according to embodiments of the present invention.

Turning now to FIG. 8, depicted is a push-notification embodiment of a methodology for using digitized release notes according to embodiments of the present invention. As shown in the embodiment illustrated in FIG. 8, a management system may receive (805) one or more notices of new features, bug fixes, compatibility of the devices, etc. via one or more digitized release notes that are consumable by the management system. In embodiments, the notice may be received from the producer of the release notes or from a centralized repository to which release notes are posted.

Because the data is in a digitized format that can be used by the management system, the system, or the system with the aid of an administrator, may ensure that the network is compliant (810) with constraints (e.g., compatibility, security, policies, rules, etc.) in light of the new release notes information. Determining compliance or identifying what should be updated may be accomplished by generating (815) a difference representation of the images to be loaded onto one or more devices in the network relative to the current configuration of the one or more devices. In embodiments, a difference representation may be based upon data stored about a device or may be obtained by directly comparing the update image to the current configuration image of the device.

Given the information of what device or devices are not compliant and what update or updates are required, the management system, or the management system and its administrator, may configure a deployment plan to intelligently deploy (820) the image(s) to those devices according to the deployment plan. Thus, in embodiments, only devices that need the update are sent the update. For example, some of the devices may already have the update. Rather than updating to all of the devices, which can contribute to excess system bandwidth usage or increased system downtime, only those devices that require the update are updated. By way of another example, updates for devices may be placed in a certain order to minimize conflicts or other incompatibility issues or to load balance usage or downtime.

Figure 9:
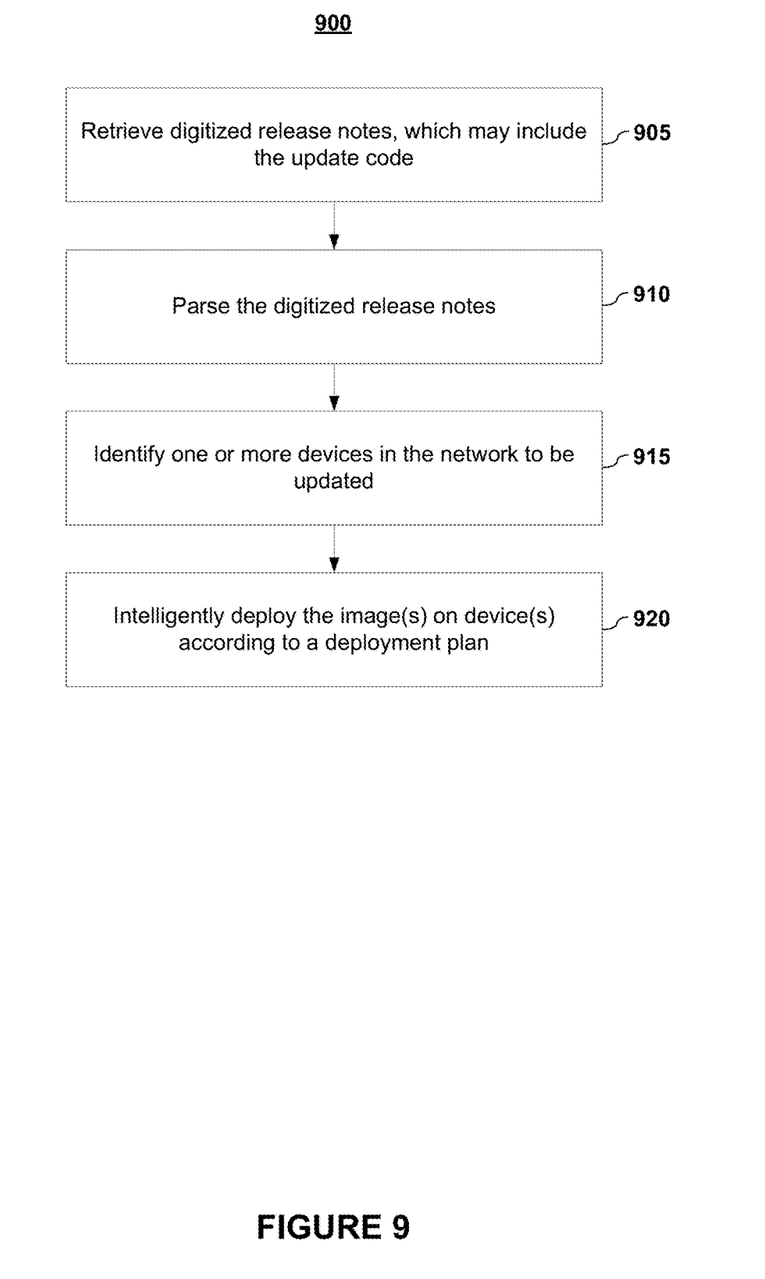
FIG. 9 depicts a pull embodiment of a methodology for using digitized release notes according to embodiments of the present invention.

FIG. 9 depicts a pull-notification embodiment of a methodology for using digitized release notes according to embodiments of the present invention. In embodiments, a management system may make a request of a repository to determine if new updates are available. If new updates are present at the repository, the management system may retrieve (905) digitized release notes. In embodiments, the management system may also retrieve the update computer code, which may be part of the release notes or may be separate. As stated before, the management system imports (910) the digitized release notes into its system.

Having the release notes data in a form that it can utilize, the management system may use the data to generate alerts, identify one or more devices in the network to be updated (915), and/or generate or execute a deployment plan that involves the intelligent deployment (920) of the image(s) to those devices that require the update.

One skilled in the art shall recognized that whether configured in a push or pull configuration, the management system may use the release notes data according to any of the prior discussed methodologies.

4. Example Use Cases

Presented herein are some example use cases. These use cases are provide by way of illustration only and shall not be used to limit the scope of the present invention.

a. Example #1

Company D may partner with a networking company or companies to act as an OEM (Original Equipment Manufacturer) of their products. Company D then has a number of supported products with various releases and operating systems—each with individual release notes for each of the variants. The networking OEM partner of Company D may have its own priorities and roadmap for implementing new RFCs or features. Thus, there may be a common occurrence that the roadmaps do not align for Company D's developed products that may be deployed in the same network— features on the products may precede or lack features implementation on other products that Company D sells. A customer, wanting a specific feature, may have to determine what part of its current deployment supports a certain new feature or RFC. Currently, the way to determine if all equipment in the deployment is compatible is to go through each piece of equipment's specifications and release notes. This is usually done by brute force—by downloading each release note and reading through them manually.

With digitized release notes for network management system (NMS), the details for each of the network devices may be directly downloaded into the NMS. Thus, the NMS may use the release note information in a database to recommend a firmware level or show a compatibility issue. Such a system may also support queries of various types, including queries related to current conditions or proposed conditions. For example, queries of the release notes may be in the form of proposed new equipment or feature additions to the deployment. In embodiments, to assist in the queries, the system may import release notes related to proposed equipment or upgrades. In embodiments, such release note may be identified or segregated as belonging to equipment not currently in use in the system. Such queries allow the admin to see in real time what options are available to him/her before a purchase or upgrade is made.

It should be noted that, in embodiments, one or more of the networking OEM partner may configure their release notes according to a digitized format so that they work with Company D's release notes. In alternative embodiments, Company D may take the traditional release notes of its networking OEM partners and convert them into a digitized format.

b. Example #2

Consider a customer of Company D who wants to add a new Access Point (AP) to their existing wireless network. The customer currently has a production environment with firmware 5.1.3 installed. The new Access Point requires firmware 6.3.0 to be used. Since the NMS is able to import the release note into the system, it has all the new features, bug lists, and requirements of the 6.3.0 firmware in its database.

The administrator may select from a field the AP model that he proposes to add to the network. From that action, it notifies the administrator that 6.3.0 is required. At the same time, 6.3.0 features and bugs may be displayed in a matrix alongside other equipment and their features. Options in the query may also highlight features that are currently in use or not in use and contain a bug or fix.

c. Example #3

Consider a customer of Company D who wants to add a new network management tool (such as, by way of example a ClearPass Policy Manager appliance) to his network, and this new appliance is desired to be the controlling center for all authentications. A key feature to allow for automatic remediation for health-related posture checks requires a RADIUS CoA feature, RFC3576 on the access switches. The admin may query the release notes database for RFC3576, and all the firmware releases supporting that feature may be displayed according to the piece of equipment currently on the network. The admin is able to see currently installed firmware and later releases. He is also able to see if some equipment does not yet have a firmware release that supports RFC3576.

One skilled in the art shall recognize other uses that fall with the scope of the present invention.

5. System Embodiments

It shall be noted that the present patent document is directed to computing systems, including but not limited to computers, network management appliances, and/or information handling systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 10:
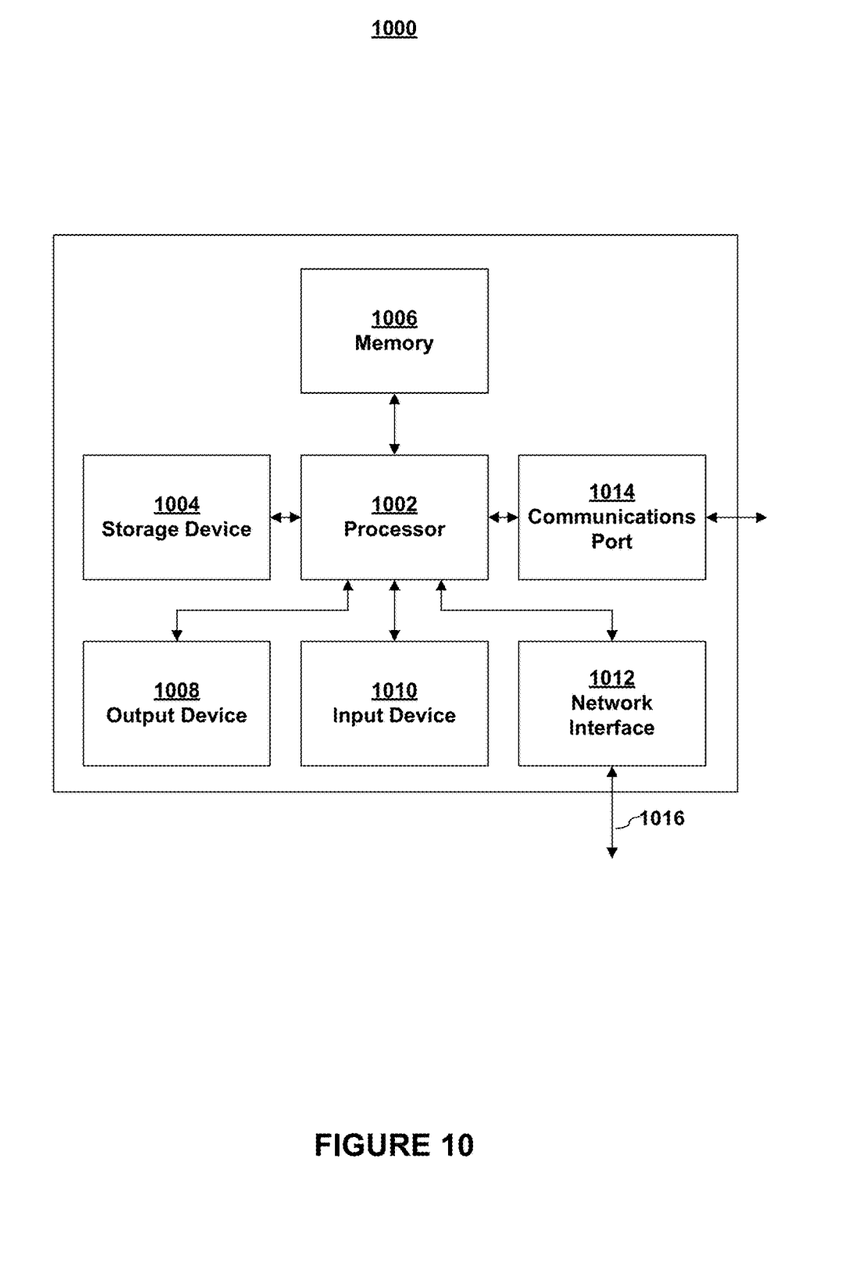
FIG. 10 depicts a block diagram of an exemplary computer system according to embodiments of the present invention.

FIG. 10 depicts a block diagram of an exemplary computing system according to embodiments of the present invention. In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. The processor or computing device may also include a graphics processor and/or a floating point coprocessor for mathematical computations. In embodiments, a storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the methods, functions, or operations discussed herein may be implemented as modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from (by way of example and not limitation) a scanner, copier, facsimile machine, server, computer, mobile computing device (such as, by way of example and not limitation a phone or tablet), or other computing device.

In embodiments, computing system 1000 may include one or more databases, some of which may store data used and/or generated by programs or applications. In embodiments, one or more databases may be located on one or more storage devices 1004 resident within a computing system 1000. In alternate embodiments, one or more databases may be remote (i.e., not local to the computing system 1000) and share a network 1016 connection with the computing system 1000 via its network interface 1014. In various embodiments, a database may be a database that is adapted to store, update, and retrieve data in response to commands.

In embodiments, all major system components may connect to a bus, which may represent more than one physical bus. However, various system components may or may not be in physical proximity to one another or connected to the same bus. In addition, programs that implement various aspects of this invention may be accessed from a remote location over one or more networks or may be conveyed through any of a variety of machine-readable medium.

One skilled in the art will recognize no computing system or programming language is critical to the practice of the present invention. One skilled in the art will also recognize that a number of the elements described above may be physically and/or functionally separated into sub-modules or combined together.

It shall be noted that embodiments of the present invention may further relate to computer products with a tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A method for using digitized release notes with a network management system, the method comprising:
   receiving a digitized release note in a format comprising fields to facilitate inputting at least some information from at least some of the fields of the digitized release note into a database;
   importing at least some information from at least some of the fields of the digitized release note into corresponding fields in a database that is accessible by a network management system; and
   using the network management system to identify one or more devices in a network managed by the network management system that may be updated based upon comparing data from the database comprising contents of the digitized release note with data related to current configurations of one or more devices in the network; and
   using the network management system and data from the database comprises contents from digitized release notes to identify an expected interaction between a first set of devices in the network and a second set of devices in the network, the expected interaction being an expected result of updating at least one of the first or second sets of devices according to an update.

2. The method of claim 1 wherein the step of using the network management system to identify one or more devices in a network managed by the network management system that may be updated based upon comparing data from the database comprising contents of the digitized release note with data related to current configurations of one or more devices in the network comprises:
   performing, via the network management system, one or more queries of the database to identify one or more updates to be applied to a set of devices in the network.

3. The method of claim 1 wherein the step of using the network management system to identify one or more devices in a network managed by the network management system that may be updated based upon comparing data from the database comprising contents of the digitized release note with data related to current configurations of one or more devices in the network comprises:
   generating a difference representation between images currently on one or more devices in the network and an image to be loaded onto the one or more devices in the network based upon data in the digitized release note.

4. The method of claim 1 wherein the database comprises contents from a plurality of digitized release notes.

5. The method of claim 4 further comprising the step of:
   using, at least in part, the network management system and data from the database comprising contents from a plurality of digitized release notes to formulate a deployment plan for deploying one or more updates to one or more devices in the network.

6. The method of claim 5 further comprising the step of:
   deploying one or more updates to one or more devices in the network according to the deployment plan.

7. The method of claim 1 wherein the digitized release note is received responsive to a request sent from the network management system.

8. The method of claim 1 wherein the digitized release note is received responsive to a new updated being received at a centralized repository that is communicatively coupled to the network management system and the new update is related to one or more devices managed by the network management system.

9. The method of claim 1 further comprising:
   sending an alert responsive to a trigger being identified in the digitized release note.

10. A method for facilitating the use of digitized release notes with a management system to manage computer code installations on devices, the method comprising:
    formatting a release note for a device into a digitized format comprising fields such that at least some of the contents of the release note can be readily entered into corresponding fields in a database; and uploading the release note in the digitized format to a central repository that is accessible by one or more management systems, wherein at least one of the one or more management systems facilitates use of data from the database comprises contents from digitized release notes to identify an expected interaction between a first set of devices in a network and a second set of devices in the network, the expected interaction being an expected result of updating at least one of the first or second sets of devices according to an update.

11. The method of claim 10 wherein the release note in the digitized format further comprises a computer code for installation on a specified type of device.

12. The method of claim 10 wherein the central repository of release notes pushes a notification to a management system when a release note in a digitized format has been uploaded to the central repository.

13. The method of claim 10 wherein the central repository of release notes provides an indication of one or more new release notes being added to the central repository responsive to a request from a management system.

14. The method of claim 10 wherein the device is a networking device.

15. The method of claim 10 wherein the release notes in digitized format are received from a plurality of vendors of devices.

16. A management system comprising:
one or more processors; and
a non-transitory computer-readable medium or media comprising one or more sequences of instructions which, when executed by the one or more processors, causes steps to be performed comprising:
receiving a digitized release note in a format comprising fields for input into a database;
importing at least some of the contents of at least some of the fields of the digitized release note into corresponding fields in a database that is accessible by the management system; and
using the management system and data from the database comprises contents from digitized release notes to identify an expected interaction between a first set of devices in a network and a second set of devices in the network, the expected interaction being an expected result of updating at least one of the first or second sets of devices according to an update.

17. The management system of claim 16 further comprising:
executing one or more queries of the database to identify computer code related to a digitized release note to be applied to a device managed by the management system based upon comparing data from the database comprising contents of the digitized release note with data related to current configurations of one or more devices managed by the management system.

18. The management system of claim 17 further comprising:
providing one or more user interface displays to display to a user at least some release notes content related to the one or more queries.

19. The management system of claim 16 further comprising:
using data from the database that comprises contents from a plurality of digitized release notes to formulate a deployment plan for deploying an update identified in digitized release note to one or more devices managed by the management system.

\* \* \* \* \*